(12) United States Patent
Ferrari et al.

(10) Patent No.: US 9,873,298 B2
(45) Date of Patent: Jan. 23, 2018

(54) DE-BEADING DEVICE FOR TIRE-CHANGING MACHINES

(71) Applicants: Gino Ferrari, Correggio (IT); Franco Maioli, Correggio (IT)

(72) Inventors: Gino Ferrari, Correggio (IT); Franco Maioli, Correggio (IT)

( * ) Notice: Subject to any disclaimer, the term of this patent is extended or adjusted under 35 U.S.C. 154(b) by 0 days.

(21) Appl. No.: 15/307,801

(22) PCT Filed: May 7, 2015

(86) PCT No.: PCT/IB2015/053325
§ 371 (c)(1),
(2) Date: Oct. 28, 2016

(87) PCT Pub. No.: WO2015/170273
PCT Pub. Date: Nov. 12, 2015

(65) Prior Publication Data
US 2017/0050479 A1    Feb. 23, 2017

(30) Foreign Application Priority Data
May 7, 2014    (IT) .............................. MO2014A0125

(51) Int. Cl.
| | | |
|---|---|---|
| *B60C 25/132* | (2006.01) | |
| *B60C 25/13* | (2006.01) | |
| *B60C 25/05* | (2006.01) | |
| *B60C 25/125* | (2006.01) | |

(52) U.S. Cl.
CPC .......... *B60C 25/13* (2013.01); *B60C 25/0506* (2013.01); *B60C 25/0518* (2013.01); *B60C 25/0572* (2013.01); *B60C 25/125* (2013.01); *B60C 25/0548* (2013.01)

(58) Field of Classification Search
CPC ... B60C 25/13; B60C 25/125; B60C 25/0506; B60C 25/0518; B60C 25/0572
USPC .................................................. 157/1.17, 1.3
See application file for complete search history.

(56) References Cited

U.S. PATENT DOCUMENTS

| | | | |
|---|---|---|---|
| 4,355,675 A | * | 10/1982 | Freixinos .............. B60C 25/025 157/1.17 |
| 5,050,659 A | | 9/1991 | Scalambra |
| 5,215,138 A | * | 6/1993 | Toriselli ................ B60C 25/025 157/1.17 |

(Continued)

FOREIGN PATENT DOCUMENTS

| | | |
|---|---|---|
| DE | 4323549 | 1/1994 |
| EP | 1329342 | 7/2003 |

(Continued)

*Primary Examiner* — Bryan R Muller
(74) *Attorney, Agent, or Firm* — Themis Law

(57) ABSTRACT

A debeading device for tire changing machines includes a swing arm having a hinging end hinged to a base of a tire changing machine and swinging in a swing plane between an active debeading position toward the base and an inactive position away from the base; a debeading tool supported at a free end of the arm, opposite to the hinging end; an actuator for reciprocatingly rotating the arm between the active and inactive positions, which includes an externally screw-threaded member supported by the base and rotatably actuated by a motor and screwingly/unscrewingly engaged in a matingly threaded hollow member associated with the arm.

4 Claims, 5 Drawing Sheets

(56) References Cited

U.S. PATENT DOCUMENTS

| | | | | |
|---|---|---|---|---|
| 7,740,043 B2 * | 6/2010 | Sotgiu | ............... | B60C 25/138 |
| | | | | 157/1.17 |
| 9,162,544 B2 * | 10/2015 | Davis | ............... | B60C 25/13 |
| 2014/0311682 A1 * | 10/2014 | Bonacini | ............... | B60C 25/13 |
| | | | | 157/1.24 |

FOREIGN PATENT DOCUMENTS

| | | | | |
|---|---|---|---|---|
| EP | 1927482 A1 * | 6/2008 | ............ | B60C 25/13 |
| EP | 2524819 | 11/2012 | | |

* cited by examiner

DE-BEADING DEVICE FOR TIRE-CHANGING MACHINES

FIELD OF THE INVENTION

The invention relates to a debeading device for tire changing machines, which is generally designed for progressive and controlled debeading of tires from their respective vehicle wheel rims.

BACKGROUND ART

Debeading apparatuses are known, which are mounted to a lateral side of the base of a tire changing machine and are used to detach the beads of pre-emptively deflated beads from the edges of the rim upon which they are mounted.

Typically, a prior art debeading apparatus consists of an arm with one end hinged to a hinge that is fixed to the lateral side of the base of a tire changing machine and an opposite free end with a debeading shovel.

The arm is horizontally movable about the hinge between an inactive position away from the base and an active position, progressively moving toward the lateral side of the base.

The arm is rotated by means of a fluid-dynamic, typically pneumatic actuator, whose liner is held within the base and whose shaft projects out of the base through an opening.

The shaft has its free end articulated to a median area of the arm, to push or pull the latter.

When the arm is moved in the position away from the base, the tire repairer may place a wheel with the tire preemptively deflated, in a vertical position, between the arm and the debeading shovel.

Then, the tire repairer will operate the actuator, which will draw the arm toward the base and, as a result, the shovel will first abut the tire bead, and then push it toward the interior of the rim, to the central channel thereof, thereby detaching it from the edge of the rim against which it abuts in the inflated state and as it runs on the road.

The tire repairer repeats the debeading steps, arc after arc, until it completes the circumference of one side of the wheel, then he/she turns it and completes debeading on the opposite side in the same manner.

This prior art suffers from certain drawbacks.

A first drawback is that the force developed by the fluid-dynamic actuator cannot be adjusted and causes the arm to be quasi instantaneously pulled toward the base.

Therefore, the arm shall have a substantially abrupt debeading operation, which will result in the risk of damaging the structure of tire sidewalls with the debeading shovel, i.e. tearing the fabric that typically composes it and affecting tire safety for further use.

A second drawback is that, since the debeading shovel is articulated to the free end of the arm such that it may be displaced in space during debeading, tire repairers shall manually orient it with the utmost care, at least until it contacts the tire bead, in a first area, i.e. very proximate the rim edge, which involves the risk that the latter may be contacted thereby, and damaged.

Therefore, tire repairers shall direct the orientation of the debeading shovel only using their own forces and by quick movements, to keep pace with the action of the debeading arm.

Nevertheless, in spite of the care taken by tire repairers, the force of the actuator may exceed their physical force, whereby the debeading shovel will not be properly oriented, and hence the front edge thereof will once again impact the rim edge during debeading, with the risk of damaging it.

Disclosure of the Invention

One object of the invention is to improve the prior art.

Another object of the invention is to provide a debeading device for tire changing machines that affords controlled debeading, in terms of both force and speed.

A further object of the invention is to provide a debeading device for tire changing machines that allows tire repairers to easily guide the debeading shovel for appropriate and accurate positioning thereof, while avoiding any contact with the rims and any resulting risk of damaging the latter.

In one aspect the invention relates to a debeading device for tire changing machines as defined in the features of claim 1.

The invention affords the following advantages:
controllably debeading tires from their rims, with no risk of damage to the latter;
debeading tires without tearing their structure.

BRIEF DESCRIPTION OF THE DRAWINGS

Further characteristics and advantages of the invention will be more apparent from the detailed description of a preferred, non-exclusive embodiment of a debeading device for tire changing machines, which is shown as non-limiting example in the annexed drawings, in which.

DETAILED DESCRIPTION OF A PREFERRED EMBODIMENT

Figure 1:
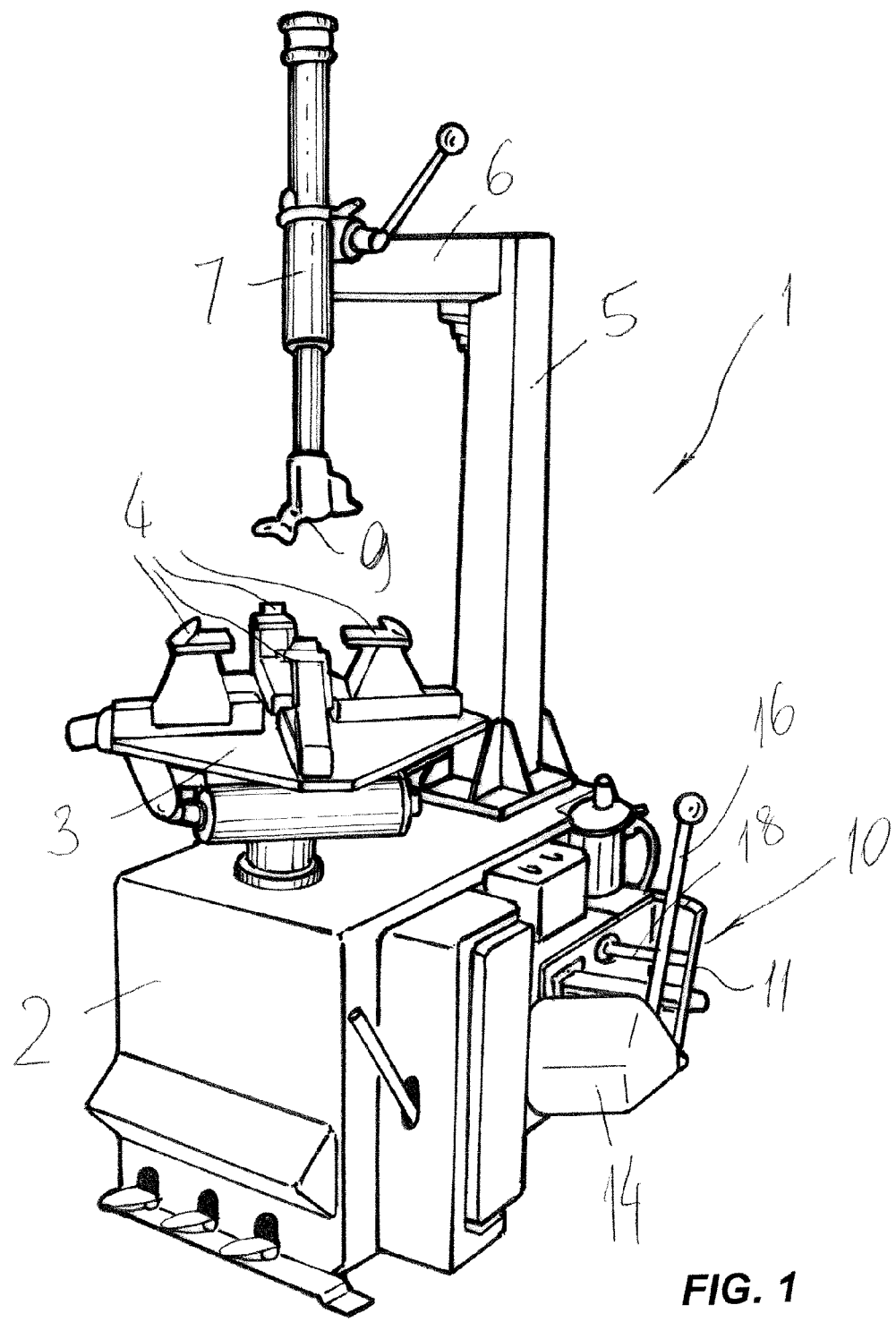
FIG. 1 is a perspective view of a tire changing machine equipped with a debeading device for tire changing machines according to the invention.

Referring to FIG. 1, numeral 1 generally designates a tire changing machine comprising a base 2 having a rotating platform 3 mounted thereon, which is equipped with a plurality of claws 4 for gripping and securing the rim of a vehicle wheel, not shown.

A column 5 rises from a side intended as the rear side of the tire changing machine 1, hereinafter briefly machine 5, and has a horizontal operating arm 6 mounted to its top, as is known to the skilled person.

The free end of the arm 6 facing away from the column 5 has a sleeve 7 mounted thereto, which is perpendicular to the operating arm 6, i.e. has a vertical orientation, and slidably receives a shaft 8 which has at its bottom a connection for an interchangeable work tool 9.

A debeading device, generally referenced 10, is mounted to a lateral side of the machine 1, e.g. the right side "1D" as seen by the viewer of FIG. 1.

More in detail, this debeading device 10 comprises an arm 11 having a proximal end 11A hinged to the lateral side "1D" via a pair of parallel brackets 12 that horizontally extend from the lateral side "1D" and have a hinge pin 13 supported therebetween and also extending through and perpendicular to the end 11A.

The arm 11 has an opposite distal end 11B that supports a debeading shovel 14 via an articulated connection 15 which allows it to be rotated in space through limited angles, by being manually guided by a tire repairer by means of a guide knob 16.

The debeading shovel 14 has a front edge 17 which is designed to press upon a wheel tire bead to be removed, such that it may be accurately positioned and pushed between the bead and the rim edge upon which it is mounted, i.e. substantially fitting the curved profile of both.

The arm is rotatably actuated 11 to follow circle arcs in a horizontal plane and is rotated by a worm 18 which is rotatably actuated by a motor unit held within the base 2 and not shown.

The worm 18 extends through the lateral side "1D" by fitting into an aperture 19 formed therein for this purpose, and has a distal end facing outwards, which is engaged in an internally matingly threaded sleeve 20, which is hinged to the arm 11 with a hinge axis 21 transversely perpendicular to the arm 11.

In a preferred embodiment, the latter, as shown in the figures, has a C-shaped structure with the sleeve 20 contained between the upper and lower wings thereof, and being able to swing about the hinge axis 21.

The thread pitch of the worm 18 and of the internal mating threads of the sleeve 20 is selected according to the speed required in rotating the arm 11 about the hinge pin 13, in the directions of arrows "A".

This rotation will have a limited range, sensor members 22 and 23 being provided at the end positions of the arm 11 (see FIG. 4 in particular) which will detect and determine limit stop positions by contact with opposite edges 11C and 11C of the end 11A.

The sensors 22 and 23 are mounted to respective support brackets 24 via fastener elements 25 whose position is adjustable by adjusting means 26 to change the rotation ranges of the arm 11.

These adjustment means 26 comprise respective pairs of slots 27 for engagement of shanks of locking bolts 28, which are tightened in the fastener elements 25 once they have been fitted through the slots 27.

Figure 2:
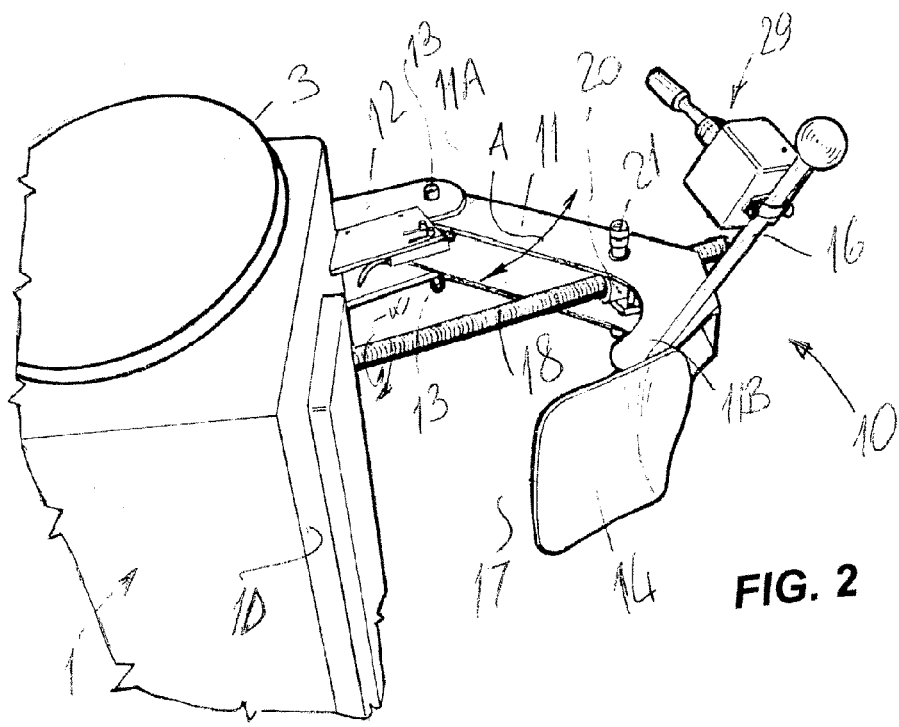
FIG. 2 is an enlarged perspective broken-away view of a debeading device for tire changing machines according to the invention.
Figure 3:
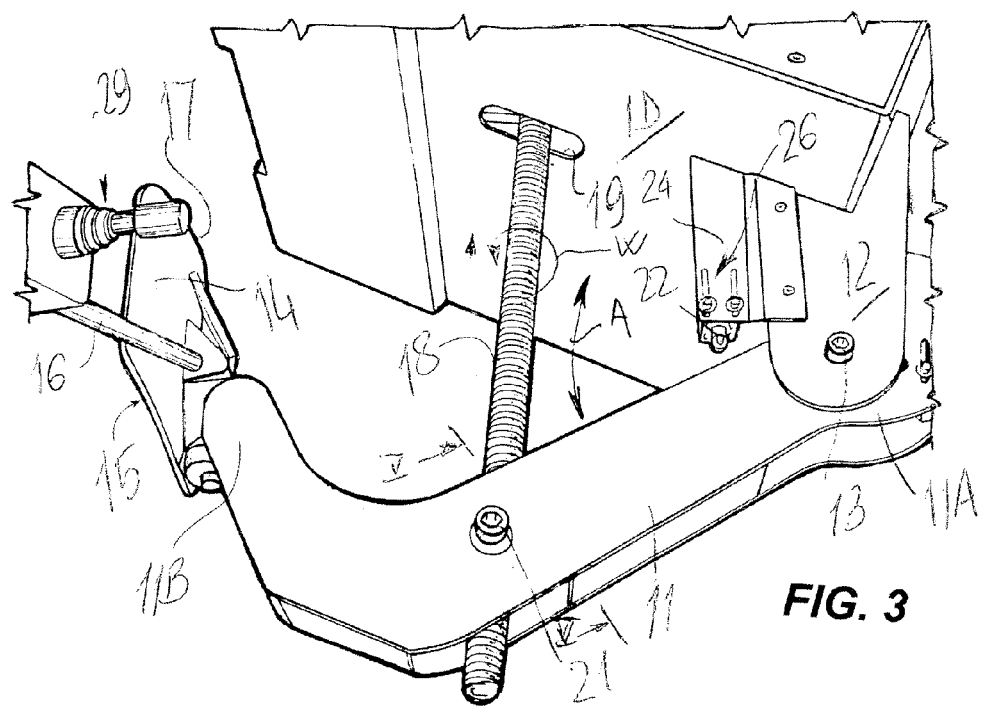
FIG. 3 is a further enlarged, broken-away view of a detail of the device of FIG. 2.
Figure 5:
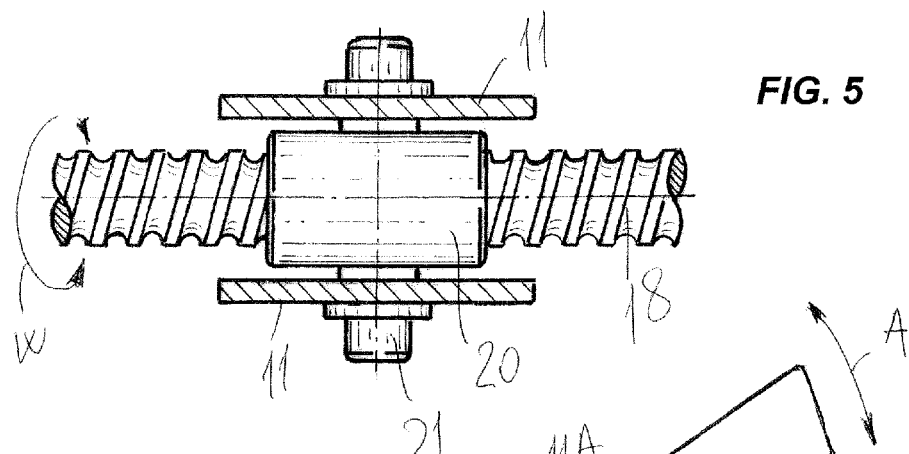
FIG. 5 is a cross-sectional view of a construction detail of a point of connection of a debeading arm to the device of FIG. 1, as taken along a plane V-V of FIG. 3.
Figure 4:
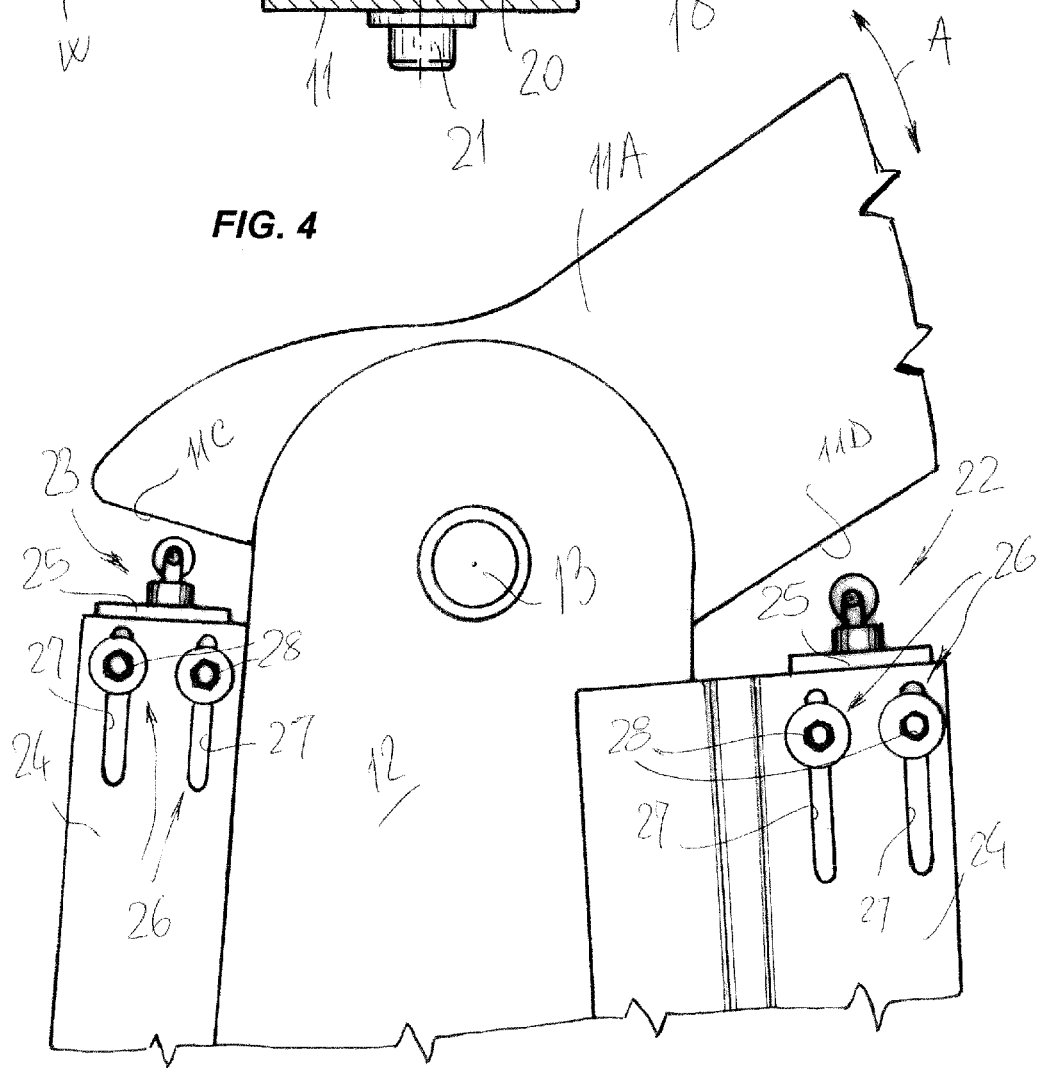
FIG. 4 is a greatly enlarged broken-away view of an area of attachment of the device of FIG. 2 to a tire changing machine.

A control member 29 is mounted to the knob 16, and is designed to be actuated by a tire repairer to actuate rotation of the worm 18 in either direction, as shown by arrows "W" of FIGS. 2, 3, 4.

Figure 9:
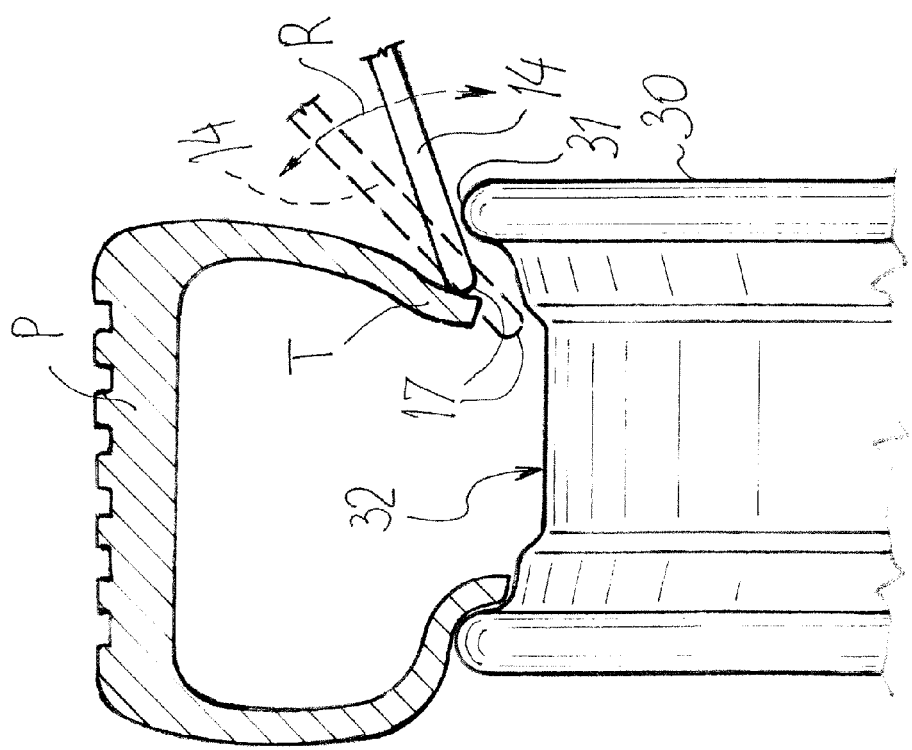
FIG. 9 is a highly schematic view of a debeading step, in which a sidewall of a tire is debeaded from the rim using the debeading shovel as shown in FIG. 6.
Figure 7:
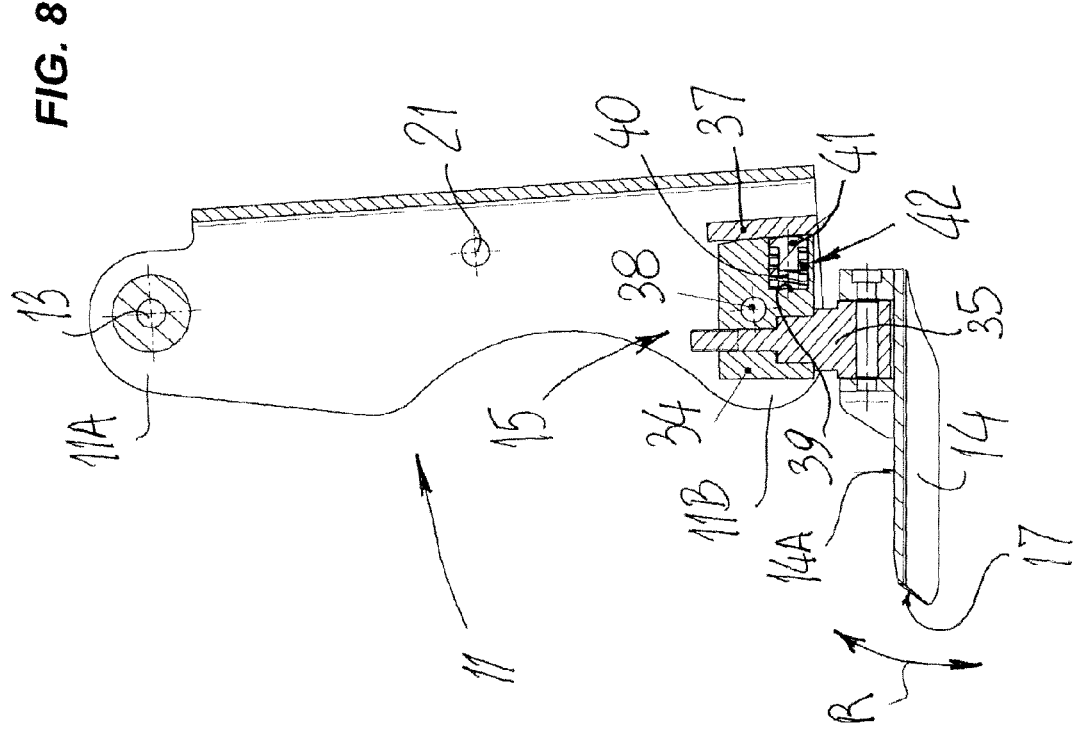
FIG. 7 is a top view of the detail of FIG. 6 in a rest configuration of the debeading shovel.
Figure 8:
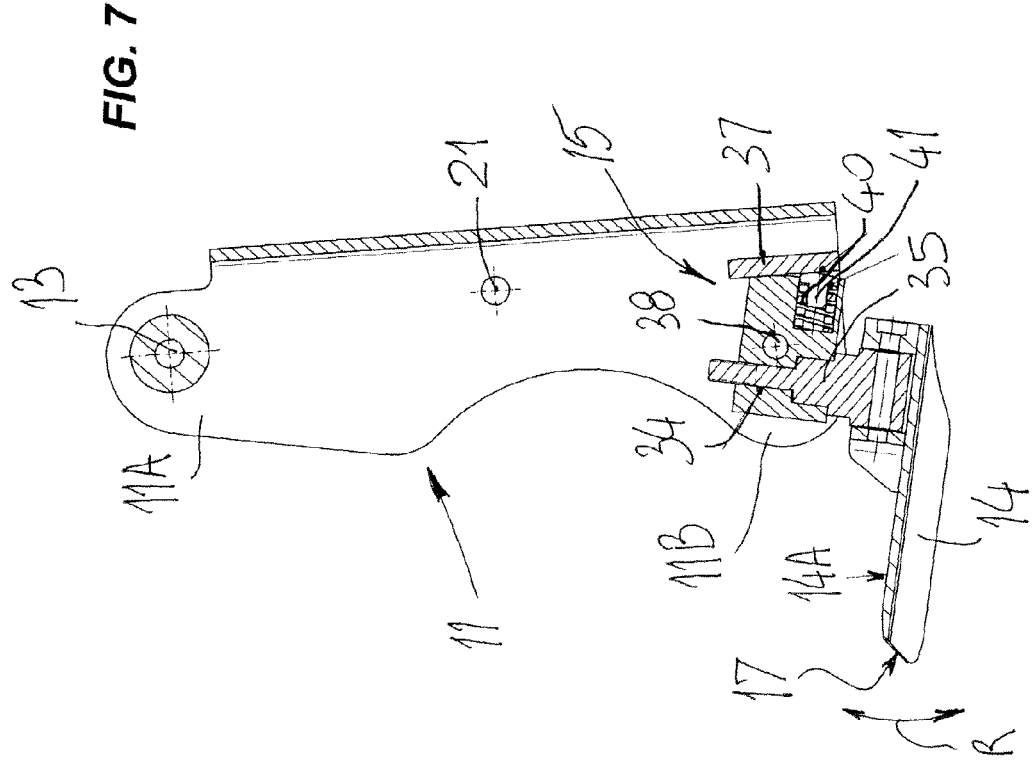
FIG. 8 is a top view of the detail of FIG. 6 in a work configuration of the debeading shovel.

Referring now to FIGS. 7, 8 and 9, the articulated connection 15 is shown to allow the debeading shovel 14 to elastically and automatically fit the inner profile of a rim 30.

Namely, it shall be noted that once the front edge 17 of the shovel 14 has been fitted between the edge 31 and the central channel 32 of the rim 30, while it is being introduced between the bead "T" of a tire "P" and the edge 31, it can pass over the latter by rotating around it without damaging, by a rotary motion indicated by the arrows "R" of FIGS. 7, 8 and 9.

Figure 6:
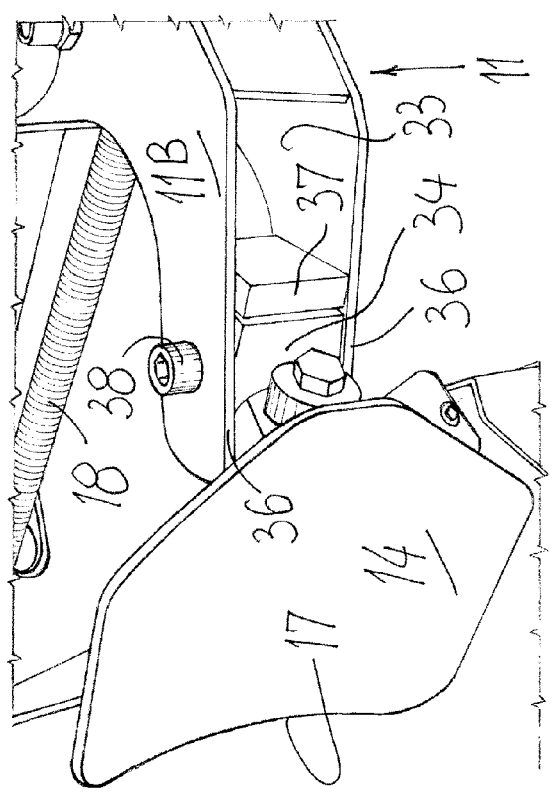
FIG. 6 is a perspective view of a detail of a debeading shovel of a debeading device that equips the tire changing machine.

Thus, it shall be noted with reference to FIGS. 6, 7, 8 that the end 11B of the arm 11 has such a shape as to form a recess 33 for a parallelepipedal block 34 with which the rear face 14a of the debeading shovel 14 is joined by means of welding and a support bracket 35.

In short, the recess 33 is formed of two parallel superimposed wings 36 (see FIG. 6) which extend from the end 11B and from a vertical transverse wall 37 that joins them, thereby leaving the receptacle open at both sides and at the distal end, i.e. the end that faces the shovel 14.

The block 34 is articulated between the two wings 36 by means of an articulation pin 38 which is perpendicular to both and allows the wings 36 to rotate in a parallel plane in the directions of arrows "R". Compression-loadable elastic means 42 are interposed between the block 34 and the vertical wall 37 and have the purpose of maintaining the block 34 in a predetermined, slightly rotated initial position as shown in FIG. 7, in which the debeading shovel 14 is in a rest configuration.

In greater detail, the elastic means 42 comprise a hollow seat 39 formed in the prismatic block 33, which houses a helical spring 40 having at least one end within the seat 39, guided by a spring guide 41, the latter being held in contact with the vertical wall 37 by the bias of the spring 40.

The operation of the debeading device 10 is as follows: when a tire repairer has to demount a tire from a vehicle wheel, before placing and securing the latter on the rotating work platform which typically equips a tire changing machine 1, he/she completely deflates it and debeads it from the edges 31 of the rim upon which it is mounted.

In order to do this, he/she places the wheel in a vertical position between the lateral side "1D" of the base 2 of the tire changing machine 1 after preemptively moving the arm 10 away from the lateral side "1D".

Then, using the control member 29, he/she actuates the motor unit to rotate the worm 18 which is engaged in the sleeve 20 mounted on the arm 10 and progressively draws it toward the lateral side "1D" until the front edge 17 of the debeading shovel 14 abuts the bead "T" of the tire "P" and starts to push it toward the central channel 32 of the rim 30.

As the worm 18 is further rotated, a portion of the bead "T" is detached from the edge 31 of the rim 30 and is pushed toward the central channel 32 of the latter.

As the shovel 14 applies a thrust on the bead "T" to bend it and detach it from the edge 31, the reaction force generated by the bending strength of the bead "T" is transferred to the shovel 14 and cause it to progressively rotate about the articulation pin 38 with the block 34 that rotates in the recess 33, thereby compressing the spring 40.

Such progressive rotation of the shovel 14 allows the front edge 17 thereof to fit between the bead "T" and the edge 31 into the channel 32, while rotating around the edge 31 and passing over it without damaging it.

As soon as the debeading step is completed, the tire repairer reverses the direction of actuation of the motor unit and the worm 18 starts to drive back the arm 10 by rotating it outwards and releasing the wheel from the thrust of the debeading shovel 14 which progressively moves back to the rest configuration under the bias of the spring 40.

When the wheel is completely free, the tire repairer stops the motor unit and rotates the wheel about its center axis of rotation, to cause the next portion of the bead "T" to face the front edge 17.

Then the tire repairer starts the motor unit again, such that the worm 18 can draw the arm 10 again toward the lateral edge "1D" and thus debeads a second portion of the bead "T".

The tire repairer repeats the above described steps along the entire circumference of the bead "T" on one side of the tire "P" and then, once it has released and turned the wheel to place it against the lateral side 1D, also on the other side, thereby entirely debeading the tire "P" in a progressive and controlled manner, according to the angular speed of the worm 18, its thread pitch and that of the sleeve 20, without generating quick and abrupt thrusts between the debeading shovel 14 and the bead "T" of the tire "P".

The invention has been found to fulfill the intended objects.

The invention so conceived is susceptible to changes and variants within the inventive concept.

Also, all the details may be replaced by other technical equivalent elements.

In its practical implementation, any material, shape and size may be used as needed, without departure from the scope as defined by the following claims.

The invention claimed is:

1. A de-beading device for tire-changing machines comprising:
    one swinging arm having a hinging end hinged to a base of a tire-changing machine and swinging in a swinging plane between an active de-beading position toward the base and an inactive position away from the base;
    a de-beading tool which is held at one free end of said arm opposing said hinging end; and
    an actuator to rotate said free end of said arm in a circular arc alternatively between said active and said inactive positions,
    wherein said actuator comprises a threaded member held by said base and having an outer thread, and being rotatably actuated by a motor and screwingly/unscrewingly engaged in a matingly threaded hollow member coupled to said arm and having a mating thread; and
    wherein said de-beading tool is swingingly associated by an association system to said free end, parallel to said swinging plan, the association system comprising:
        an opening obtained in said free end of said arm;
        a prismatic body rotatably received in said opening to rotate around a joint pin having longitudinal axis perpendicular to said arm;
        a support bracket of said de-beading tool connected both to the de-beading tool and said prismatic body; and
        an elastic member housed in an opening in said prismatic body and fitted between said prismatic body and a wall extending within said opening.

2. The device as claimed in claim 1, wherein said threaded members comprises a worm-screw held by said base and extending therefrom and facing outwardly.

3. The device as claimed in claim 1, wherein said hollow matingly threaded member comprises a sleeve swingingly coupled to said arm around a hinge axis transversal to the arm and parallel to said swinging plane.

4. The device as claimed in claim 1, further comprising a detection sensor interposed between said swinging arm and said base, and designed to detect said active or inactive positions.

* * * * *